(12) United States Patent
Howard et al.

(10) Patent No.: US 11,399,425 B2
(45) Date of Patent: Jul. 26, 2022

(54) SYSTEM AND METHOD FOR GENERATING AND ACCELERATING MAGNETIZED PLASMA

(71) Applicant: General Fusion Inc., Richmond (CA)

(72) Inventors: Stephen James Howard, Burnaby (CA); Douglas Harvey Richardson, Anmore (CA); Michel Georges Laberge, West Vancouver (CA); Meritt Wayne Reynolds, New Westminster (CA); Aaron Matthew Froese, Coquitlam (CA); Kelly Bernard Epp, Langley (CA); Martin Clifford Wight, White Rock (CA); Yakov Gofman, Richmond (CA)

(73) Assignee: General Fusion Inc., Richmond (CA)

( * ) Notice: Subject to any disclaimer, the term of this patent is extended or adjusted under 35 U.S.C. 154(b) by 0 days.

(21) Appl. No.: 17/607,169

(22) PCT Filed: May 28, 2020

(86) PCT No.: PCT/CA2020/050727
§ 371 (c)(1),
(2) Date: Oct. 28, 2021

(87) PCT Pub. No.: WO2020/237380
PCT Pub. Date: Dec. 3, 2020

(65) Prior Publication Data
US 2022/0151054 A1 May 12, 2022

Related U.S. Application Data

(60) Provisional application No. 62/853,669, filed on May 28, 2019.

(51) Int. Cl.
 *H05H 1/54* (2006.01)
 *H01F 7/06* (2006.01)
 *H05H 1/12* (2006.01)

(52) U.S. Cl.
 CPC .............. *H05H 1/54* (2013.01); *H01F 7/064* (2013.01); *H05H 1/12* (2013.01)

(58) Field of Classification Search
 None
 See application file for complete search history.

(56) References Cited

U.S. PATENT DOCUMENTS 5,147,596 A * 9/1992 Weil ........................ G21B 1/052
 376/134
8,279,994 B2 * 10/2012 Kotschenreuther ...... G21B 1/01
 376/173

(Continued)

FOREIGN PATENT DOCUMENTS

| EP | 3183944 B1 | 6/2017 | |
| WO | WO-2005001845 A2 * | 1/2005 | ............... G21B 1/23 |
| WO | WO-2020237380 A1 * | 12/2020 | ............... H05H 1/12 |

OTHER PUBLICATIONS

International Search Report and Written Opinion received in PCT Application No. PCT/CA2020/050727, dated Aug. 18, 2020 in 7 pages.

(Continued)

*Primary Examiner* — Srinivas Sathiraju
(74) *Attorney, Agent, or Firm* — Knobbe, Marten, Olson & Bear, LLP

(57) ABSTRACT

A method and system for stably generating and accelerating magnetized plasma comprises ionizing an injected gas in a plasma generator and generating a formation magnetic field to form a magnetized plasma with a closed poloidal field, generating a reverse poloidal field behind the magnetized plasma and having a same field direction as a back edge of (Continued)

the closed poloidal field and having an opposite field direction of the formation magnetic field, and generating a pushing toroidal field that pushes the reverse poloidal field against the closed poloidal field, thereby accelerating the magnetized plasma through a plasma accelerator downstream from the plasma generator. The reverse poloidal field serves to prevent the reconnection of the formation magnetic field and closed poloidal field after the magnetized plasma is formed, which would allow the pushing toroidal field to mix with the closed poloidal field and cause instability and reduced plasma confinement.

22 Claims, 3 Drawing Sheets

(56) References Cited

U.S. PATENT DOCUMENTS

| | | | | |
|---|---|---|---|---|
| 8,537,958 | B2* | 9/2013 | Laberge | G21B 3/008 376/121 |
| 8,891,719 | B2* | 11/2014 | Howard | G21B 3/006 376/150 |
| 9,267,515 | B2* | 2/2016 | Suponitsky | H05H 1/24 |
| 9,596,745 | B2* | 3/2017 | Laberge | H05H 1/105 |
| 9,754,686 | B2* | 9/2017 | Jarboe | G21B 1/17 |
| 9,875,816 | B2* | 1/2018 | Laberge | G21B 3/008 |
| 10,049,774 | B2* | 8/2018 | Tuszewski | H05H 1/10 |
| 10,217,532 | B2* | 2/2019 | Binderbauer | H05H 1/54 |
| 10,546,660 | B2* | 1/2020 | Laberge | F15D 1/0095 |
| 10,665,351 | B2* | 5/2020 | Binderbauer | H05H 1/54 |
| 10,811,144 | B2* | 10/2020 | Laberge | G21B 1/057 |
| 10,984,917 | B2* | 4/2021 | Laberge | H05H 1/54 |
| 11,013,100 | B2* | 5/2021 | Hidding | H05H 1/46 |
| 11,107,592 | B2* | 8/2021 | Prater | G21B 1/057 |
| 11,200,990 | B2* | 12/2021 | Binderbauer | H05H 1/54 |
| 11,217,351 | B2* | 1/2022 | Gonzalez | G21B 1/13 |
| 2011/0026657 | A1* | 2/2011 | Laberge | H05H 1/16 376/133 |
| 2014/0247913 | A1* | 9/2014 | Laberge | H05H 3/06 376/133 |
| 2016/0314855 | A1* | 10/2016 | Laberge | G21B 1/057 |
| 2018/0190390 | A1* | 7/2018 | Laberge | G21B 1/057 |
| 2019/0139650 | A1* | 5/2019 | Laberge | G21B 1/21 |
| 2021/0217536 | A1* | 7/2021 | Laberge | H05H 1/02 |

OTHER PUBLICATIONS

Degnan et al., "Compact toroid formation, compression, and acceleration", Physics of Fluids B: Plasma Physics, vol. 5, No. 8, dated Aug. 1993, pp. 2938-2958.

Yamada et al., "Magnetic Reconnection of Plasma Toroids with Co- and Counter-Helicity", Physical Review Letters, vol. 65, No. 6, dated Aug. 6, 1990, in 13 pages.

* cited by examiner

SYSTEM AND METHOD FOR GENERATING AND ACCELERATING MAGNETIZED PLASMA

TECHNICAL FIELD

The present disclosure relates generally to a system and method for generating magnetized plasma and more particularly to a system and method for producing a magnetic field configuration in a plasma device to facilitate plasma confinement during plasma formation and plasma acceleration.

BACKGROUND

Unless otherwise indicated herein, the materials described in this section are not prior art to the claims in this application and are not admitted to be prior art by inclusion in this section.

Plasma is a state of matter similar to gas in which at least part of the particles are ionized. The presence of freely moving charged particles (e.g. positive ions and negative electrons) makes plasma electrically conductive. Plasma with a magnetic field strong enough to influence the motion of the charged particles is called magnetized plasma. The magnetic field within plasma can confine the plasma particles and prevent them from hitting a vessel's walls for an extended period of time if the magnetic field lines are configured to loop back on themselves in closed orbits (possibly infinite in length). The volume occupied by plasma can be shaped like a torus, so that a closed magnetic field line orbits in a circular or helical path on the surface of a particular toroidal layer within the volume of the plasma. The closed magnetic field acts as an extremely good thermal insulator maintaining a temperature gradient of many millions of degrees Kelvin per cm between the hot plasma core and the vessel's wall temperature. The magnetic field used to confine plasma particles can be created and maintained by some combination of external electrical currents flowing in coils and conductive walls, as well as currents flowing inside the plasma itself. The range of possible magnetic confinement devices is parameterized by the degree of tradeoff between the use of external vs internal currents to source the magnetic field. Stellarators are devices that use entirely external coils to create the magnetic field with almost no plasma current. Tokamaks have dominantly external-sourced fields, but do rely on plasma current for plasma heating and controlling the twist of helical field lines. Reversed Field Pinch (RFP) devices rely on significant internal plasma currents created by the transformer action of a time dependent flux-core running through the center hole of the toroidal vessel. In Compact Toroid (CT) devices, the closed magnetic field is produced entirely from internal plasma currents, thus a CT plasma is said to be a self-confined plasma. A CT plasma may be further stabilized and prevented from expanding by being contained in a conductive shell or an externally generated magnetic field, however these external sources are not responsible for generating the closed part of the magnetic field that directly confines the plasma. By being self-confined, a CT plasma can be formed in one location and then translated into another location without disrupting its confinement ability.

There are two distinct directions of the magnetic field on the surface of a plasma torus: a poloidal direction which goes the short way around the torus threading through the central hole as it does so, and a toroidal direction which goes the long way around, circling the axis of rotational symmetry of the torus. Any axisymmetric vector field (such as the equilibrium magnetic field) that exists throughout the volume of the torus can have the vector at each location described as the sum of toroidal and poloidal components.

For the magnetic field of a plasma torus, the poloidal component of the magnetic field is created by electric current running through the circular core of the plasma in the toroidal direction. The magnetic field can also have a toroidal component at a given point in space if there is an electric current flowing in the poloidal direction on the surface of a torus that encloses the point in question. In this way poloidal currents near the edge of the plasma give rise to toroidal magnetic fields inside the plasma's core, and toroidal currents near the plasma's core give rise to poloidal magnetic fields near the plasma's edge. A given magnetic field line within an axisymmetric equilibrium will wrap around the surface of a particular sub-torus and not move off of it, which means the amount of poloidal flux enclosed by each toroidal circle on that surface will be a constant; therefore we refer to this as a flux surface (flux [Webers] =magnetic field strength [Tesla] times area [meters$^2$]). The degree of topological linking of the two components of magnetic flux is called magnetic helicity and is proportional to product of the total poloidal magnetic flux and the amount of toroidal magnetic flux that is contained inside it. Lastly, when we refer to a surface as being torus-like we mean that it may have a cross section in the poloidal plane that is not necessarily exactly circular. Any smooth closed curve (without self-intersections) can be used as the poloidal cross section and revolved about a z-axis to create a torus-like surface or toroid.

Compact Toroids (CTs) can be divided into two main subcategories; Spheromak and Field Reversed Configuration (FRC). The magnetic field of a Spheromak plasma has both poloidal and toroidal magnetic flux, linked to give significant helicity. It is typically close to a relaxed minimum energy state where electric current only flows mostly parallel to the magnetic field lines and can be magnetohydrodynamic (MHD) stable against disruptive instabilities. The field of an FRC is almost entirely poloidal and has almost zero helicity.

Thermal insulating ability of the magnetic field of an axisymmetric MHD equilibrium is theoretically very high, yet can be reduced significantly if plasma fluctuations cause a deviation from this equilibrium. Since the path of charged particles in a magnetic field is confined to helical paths aligned with the field lines, great care should be taken to ensure that the magnetic field lines run in the toroidal and poloidal directions but not along the radial direction to avoid a direct route from the core to the edge of the plasma. The ratio of toroidal to poloidal field on a flux surface can best be described by tracing out a field line and counting the number of toroidal turns it completes before completing one poloidal turn and this number is called the "safety factor", notated by the variable q. How this varies in the radial direction within the plasma is described by the function called a q-profile, and the exact shape of the q-profile is a primary factor in determining the MHD stability of the plasma. For example, when the safety factor takes on exactly rational values $$q = \frac{m}{n},$$

where m and n are integers (typically worst for small values of {m, n} less than or equal to 3), then each field line on a flux surface exactly closes back on itself after a relatively short finite path length. Then displacement perturbations of neighboring field lines add constructively in phase with each other, and if other conditions are met this leads to a growing deviation from axisymmetry (an instability) localized to region near the surface of rational q. If several of these unstable regions overlap, then magnetic field line displacements away from the original flux surfaces compound themselves across all the surfaces and a single field line may then wander from the hot plasma core back and forth in the radial direction eventually meandering all the way to the cold edge, and greatly reduce the thermal energy confinement of the plasma, acting as an almost direct path for heat to flow from the core to the edge of the plasma.

SUMMARY

In one aspect, a system for generating and accelerating magnetized plasma is provided. The system comprises a plasma generator for generating a magnetized plasma toroid and a plasma accelerator fluidly coupled to the plasma generator to accelerate such magnetized plasma toroid for certain distances. The accelerator is positioned downstream from the plasma generator so that a downstream end of the plasma generator and an upstream end of the accelerator together define an acceleration gap and a relaxation region. A power source is in electrical communication with the plasma generator and the plasma accelerator is configured to provide a power pulse therein across. A formation magnetic field generator such as a set of coils or permanent magnets is used to provide a formation magnetic field in the plasma generator. A reverse poloidal field generator such as one or more additional coils or permanent magnets is positioned in proximity to the acceleration gap to provide a reverse poloidal magnetic field across the acceleration gap. A radial component of the reverse poloidal field is opposite of a direction of the formation poloidal field, so that when the power source provides a current pulse across the accelerator, the reverse poloidal magnetic field is pushed out into the relaxation region behind the magnetized plasma and is then in a same radial direction to a back edge of a plasma's closed poloidal field but opposite the direction of the formation poloidal field in the plasma generator.

According to another aspect, there is provided a method for generating and accelerating magnetized plasma comprising: ionizing a gas in a plasma generator and generating a formation magnetic field; generating a magnetized plasma toroid with a closed poloidal field that moves from the plasma generator into a relaxation region; generating a reverse poloidal field behind the magnetized plasma toroid, the reverse poloidal field having a same field direction as a back edge of the closed poloidal field and having an opposite field direction of the formation magnetic field; and generating a pushing toroidal field that pushes the reverse poloidal field against the closed poloidal field, thereby accelerating the magnetized plasma toroid through a plasma accelerator downstream from the plasma generator.

More particularly, the method can comprise sending a first current pulse to the plasma generator to ionize the gas and create the closed poloidal field, and sending a second current pulse to the plasma accelerator to generate the pushing toroidal field. After generation in the plasma generator and prior to acceleration in the in the plasma accelerator, the magnetized plasma toroid can expand and stabilize in the relaxation region.

The reverse poloidal field can be generated across an acceleration gap between a downstream end of the plasma generator and an upstream end of the plasma accelerator. Generating the reverse poloidal field can comprise generating a reverse poloidal flux in the range of $0.1\text{-}0.25*\psi_{CT}$, wherein $\psi_{CT}$ is a total poloidal flux of the magnetized plasma toroid.

The plasma generator can comprise an annular plasma formation channel and the method can further comprise injecting the gas into the plasma formation channel and forming the magnetized plasma toroid, such as a compact toroid or a spherical tokamak. The gas can comprise any one or mixture of hydrogen, isotopes of hydrogen, neon, argon, krypton, xenon and helium. The plasma accelerator can also comprise a tapering annular channel, and the method can further comprise compressing and heating the plasma toroid while accelerating through the tapering annular channel.

According to another aspect, there is provided a system for generating and accelerating a magnetized plasma toroid comprising a plasma generator, a plasma accelerator, at least one reverse poloidal magnetic field generator, and at least one power source. The plasma generator comprises ionizing electrodes operable to ionize a gas and at least one formation magnetic field generator operable to generate a formation magnetic field. The plasma accelerator is fluidly coupled to the plasma generator and comprises accelerator electrodes operable to generate a pushing toroidal field. A downstream end of the plasma generator and an upstream end of the plasma accelerator together define an acceleration gap and a relaxation region, and the reverse poloidal magnetic field generator is operable to generate a reverse poloidal field across the acceleration gap. The relaxation region can be configured for the magnetized plasma toroid to expand and stabilize therein. The at least one power source is electrically coupled to the ionizing electrodes and the accelerator electrodes. The at least one power source is operable to: generate a magnetized plasma toroid with a closed poloidal field that moves from the plasma generator to the relaxation region wherein the reverse poloidal field is behind the magnetized plasma toroid and has a same field direction as a back edge of the closed poloidal field and has an opposite field direction of the formation magnetic field; and generate the pushing toroidal field to push the reverse poloidal field against the closed poloidal field thereby accelerating the magnetized plasma toroid through the plasma accelerator. The formation magnetic field generator and the reverse poloidal magnetic field generator can each comprise one or more magnetic coils or permanent magnets.

Ferromagnetic material can be positioned at each side of the acceleration gap to increase the reverse poloidal field across the acceleration gap. The ferromagnetic material can comprise at least one ring, annular disc, or series of spaced segments circumscribing the inner electrode of the accelerator electrodes or ionizing electrodes. For example, there can be an annular disc positioned at an upstream end of an inner electrode of the accelerator electrodes, and an annular ring positioned at a downstream end of an inner electrode of the ionizing electrodes. The number and location of the at least one reverse poloidal magnetic field generator can be selected to generate a reverse poloidal flux of $0.1\text{-}0.25*\psi_{CT}$, wherein $\psi_{CT}$ is total poloidal flux of the magnetized plasma toroid. For example, the formation magnetic field generator can comprise three formation magnetic coils and the reverse poloidal field generator can comprise one reverse poloidal magnetic coil.

The ionizing electrodes can be annular and define an annular plasma formation channel that produces the magnetized plasma toroid, such as a compact toroid or a spherical tokamak. The accelerator electrodes can be annular and define an annular propagation channel that tapers inwardly from an inlet to an outlet.

The at least one power source can comprise at least one capacitor bank, and be operable to provide a first current pulse to the plasma generator and a second current pulse to the plasma accelerator.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 1A:
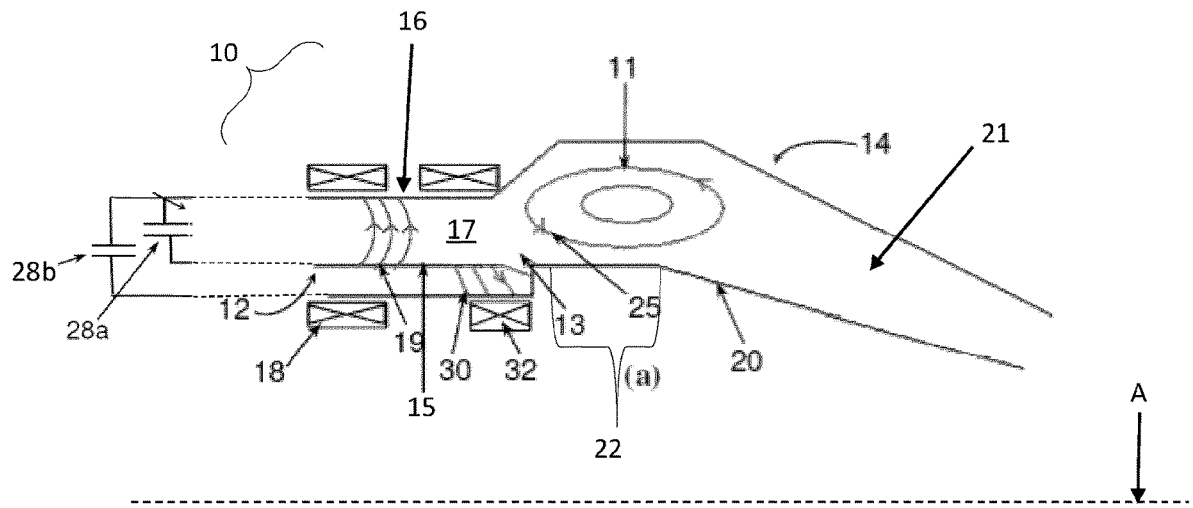
FIGS. 1(a)-(c) are schematic cross-sectional side views of a portion of a system for generating and accelerating magnetized plasma according to an embodiment of the invention, and comprising a reverse poloidal field generator, the illustrated portion being annular about axis A.

As mentioned herein before, a majority of the magnetic field in magnetized plasma is created by currents flowing in the plasma itself and/or in the wall of a flux conserving chamber. The closed magnetic field structure confines plasma thermal energy by suppressing the transit of heat and particles from the core of the plasma to its edge. Some of the major factors affecting the lifetime and stability of the plasma are a plasma formation magnetic flux configuration, gas valve timing, plasma breakdown timing, plasma temperature, density and level of unwanted impurities, current pulse profile, and size and geometry of plasma device. One primary means to limit heat transport is by controlling the MHD stability via control of the q-profile. The q-profile is indirectly controlled through a combination of control of internal plasma currents, design of the plasma geometry, and the control of the currents flowing in the wall of the vessel and electrodes.

Embodiments described herein relate to a system and method for stably generating and accelerating magnetized plasma. Embodiments of the method comprises ionizing an injected gas in a plasma generator and generating a formation magnetic field to form a magnetized plasma with a closed poloidal field, generating a reverse poloidal field behind the magnetized plasma and having a same field direction as a back edge of the closed poloidal field and having an opposite field direction of the formation magnetic field, and generating a pushing toroidal field that pushes the reverse poloidal field against the closed poloidal field, thereby accelerating the magnetized plasma through a plasma accelerator downstream from the plasma generator. The reverse poloidal field serves to prevent the reconnection of the formation magnetic field and closed poloidal field after the magnetized plasma is formed, which would allow the pushing toroidal field to mix with the closed poloidal field and cause instability and reduced plasma confinement.

Embodiments of the system are shown in FIGS. 1(a)-(c) and 3(b). More particularly, FIGS. 1(a) and (b) schematically illustrate a portion of a system 10 for generating and accelerating a magnetized plasma toroid 11, such as a compact toroid (CT) or a spherical tokamak or a combination thereof, wherein the illustrated portion is annular about axis A. The system 10 comprises an annular plasma generator 12 and an annular accelerator 14 which is positioned downstream from the plasma generator 12 so that a downstream end of the plasma generator 12 and an upstream end of the accelerator 14 together define an acceleration gap 13 and a relaxation region 22. For example, the system 10 can be based on a two stage Marshall gun to form the plasma toroid 11 in the plasma generator 12 ($1^{st}$ stage) and accelerate such plasma toroid 11 in the accelerator 14 ($2^{nd}$ stage). The plasma generator 12 comprises an inner, generally tubular formation electrode 15 and an outer generally tubular electrode 16 coaxial to and surrounding the inner formation electrode 15 (collectively, "ionizing electrodes"). The ionizing electrodes 15, 16 define an annular plasma formation channel 17 therein between. A formation magnetic field generator comprising a series of formation magnetic coils 18 are arranged around the outer electrode 16 and/or within the formation electrode 15 and are coupled to a power source (not shown) (FIG. 1(c) omits coils 18 to improve clarity of presentation). Alternatively, the formation magnetic field generator can comprise one or more permanent magnets (not shown). The series of formation magnetic coils 18 are provided in order to create an initial poloidal formation magnetic field 19 that crosses radially between the ionizing electrodes 15, 16. For example, the magnetic coils 18 can be DC solenoids. The magnetic field lines of the formation magnetic field 19 can be directed out of the inner formation electrode 15 and into the outer electrode 16. In one implementation the formation magnetic field 19 can be set up so that the magnetic field lines are directed radially inward through the outer electrode 16 into the inner electrode 15 without departing from the scope of the invention.

In order to form the plasma toroid 11, a ring of equally-spaced fast-acting gas valves (not shown) arranged around the outer electrode 16 is provided to symmetrically inject a predetermined amount of gas into the plasma formation channel 17. The valves can be electromagnetic valves, piezo valves or any other suitable valves or combination thereof. The quantity of gas injected through the valves can be determined by an opening time of the valves, or by means of a plenum of known volume filled with gas of a known pressure. The gas can be hydrogen and/or its isotopes (deuterium, tritium), helium, neon, argon, krypton, xenon or any other suitable gas or a mixture of any of such gases. For example, the gas can be a mixture of 50/50 deuterium-tritium gas.

The system 10 further comprises a power source comprising a first power source 28a (shown in FIG. 1(a) only) which may for example include at least one capacitor bank and preferably two or more capacitor banks, and which is operable to provide current pulses to the plasma generator 12. In addition, the system 10 comprises a second power source 28b (shown in FIG. 1(a) only) comprising at least one capacitor bank and preferably two or more capacitor banks to provide current pulses to acceleration electrodes of the accelerator 14. For example, the first and second power sources 28a, 28b in one configuration can each be configured to provide 0.5-5 MJ energy in the plasma generator 12 and/or the accelerator 14. Once the gas has filled the formation channel 17, the first power source 28a can be triggered and a current can be discharged between the ionizing electrodes 15, 16. For example, the first power source 28a can in one configuration provide 10-40 kV pulses between the ionizing electrodes 15, 16. In another scaled up configuration, the power sources 28a, 28b can be configured to provide 0.5-50 MJ energy in the plasma generator 12 and/or accelerator 14, and the first power source 28a can provide 10-100 kV pulses between the ionizing electrodes 15, 16. The voltage applied between the ionizing electrodes 15, 16 acts to ionize the gas and form an initial plasma. The current flowing through the initial plasma in a primarily radial direction along the formation magnetic field lines 19 further increases plasma temperature and density. Such current creates a toroidal magnetic field in the plasma behind the current layer, and the gradient of the magnetic pressure will exert a Lorentz force=J×B that pushes the plasma forward in axial direction toward the accelerator 14. As the plasma moves forward, it interacts with the formation magnetic field 19, distorting and stretching the field lines until the advancing plasma breaks free through a magnetic reconnection process, thereby forming the plasma toroid 11 with a toroidal magnetic field inherited from the toroidal magnetic field due to the current, and a closed poloidal field 25 due to the interaction of the plasma with the original formation magnetic field 19 and possible poloidal flux amplification caused by plasma dynamic effects.

The downstream end of the plasma generator 12 is fluidly coupled to the accelerator 14. The accelerator 14 comprises an inner accelerating electrode 20 coaxial with the outer electrode 16 (collectively, "acceleration electrodes"). The outer electrode 16 and the inner accelerating electrode 20 define an annular propagation channel 21. In this embodiment, a downstream end of the inner formation electrode 15 and an upstream end of the inner accelerating electrode 20 together define the acceleration gap 13. In other embodiments, the acceleration gap 13 can be formed at the outer electrode 16 without departing from the scope of the invention. When the plasma toroid 11 formed in the plasma generator 12 enters the relaxation region 22 (see FIG. 1(b)), it slightly expands and the magnetic field lines reconnect, so that the plasma toroid 11 can stabilize before it is accelerated down the accelerator 14 towards its outlet. When the second power source 28b discharges a second current pulse between the acceleration electrode 20 and the outer electrode 16, the plasma toroid 11 is accelerated axially downstream of the accelerator 14 due to a toroidal field 24 that is generated due to the current flowing between the accelerating electrode 20 and outer electrode 16. The toroidal field 24 is referred to as a "pushing toroidal field" as it is located behind the plasma toroid 11 and pushes the plasma toroid 11 down the accelerator 14 toward its outlet. The accelerator 14 can have a tapering configuration narrowing toward the outlet so that when the plasma toroid 11 is accelerated down the accelerator 14 it is at the same time compressed and heated. For example, the second power source 28(b) can provide 20-100 kV across the accelerator 14 to accelerate and, in some cases, compress the plasma toroid 11 down the accelerator 14.

Figure 1B:
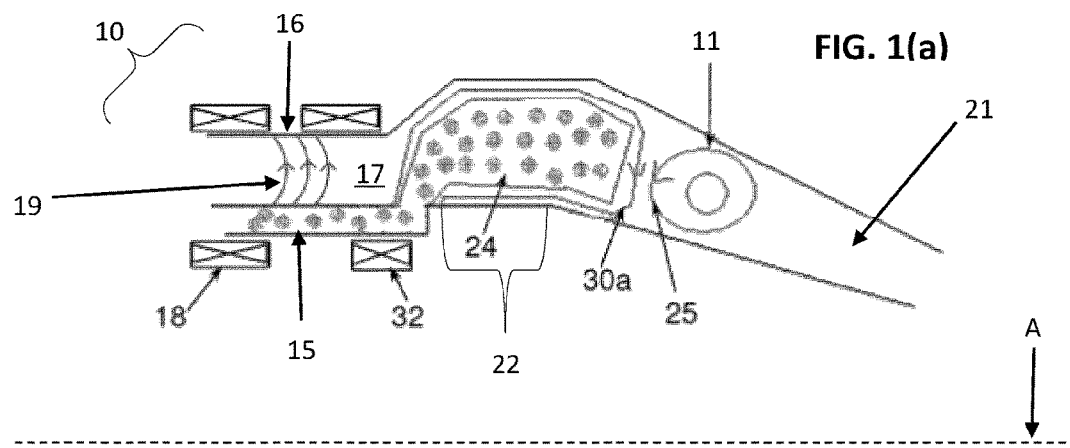

A reverse poloidal field generator comprising one or more coils 32 is operable to generate a reverse poloidal field 30 across the acceleration gap 13 that serves to prevent reconnection of the poloidal formation magnetic field 19 and the closed poloidal field 25. The direction of this reverse poloidal field 30 is set up to be in the same direction as the back edge of the closed poloidal field 25 of the plasma toroid 11, but opposite the direction of the poloidal formation magnetic field 19 (the term "back edge" means the upstream end of the closed poloidal field, which is the left side of the closed poloidal field as shown in FIG. 1(b)). The fact that the reverse poloidal field 30 across the acceleration gap 13 has a reverse polarity (directed from the formation electrode 15, across the gap 13, and to the acceleration electrode 20) than the poloidal formation magnetic field 19 in the formation region is the reason such magnetic field 30 is referred to as a "reverse" poloidal magnetic field. Any plasma that is pushed through the acceleration gap 13 into the formation electrode 16 and bubbles out into the relaxation region 22 due to the toroidal field 24 generated by the acceleration pulse, will have a reverse poloidal field 30a that is in the same direction as the back edge of the closed poloidal field 25 of the plasma toroid 11 but opposite of the direction of the formation magnetic field 19 (see FIG. 1(b)). So, the plasma bubbling out of the acceleration gap 13 with a reverse poloidal field 30a will not reconnect with the closed poloidal field 25 of the toroid 11, thus preventing diffusion of the pushing toroidal field 24 into the plasma toroid 11. The pushing toroidal field 24 will need to diffuse first through the reverse poloidal field 30a before it gets in the outside layer of the plasma toroid 11, thus delaying the rise of the q near the edge and keeping the plasma toroid 11 stable for longer.

The magnetic coils 32 of the reverse poloidal field generator are coupled to a power source (not shown) and the parameters of the reverse poloidal field 30 can be adjusted by adjusting the current through the magnetic coils 32, so that the generated reverse poloidal field 30 is in the opposite direction to the formation magnetic field 19 generated by formation magnetic coils 18. Alternatively, the reverse poloidal field generator can comprise one or more permanent magnets (not shown) instead of electromagnetic coils.

Figure 1C:
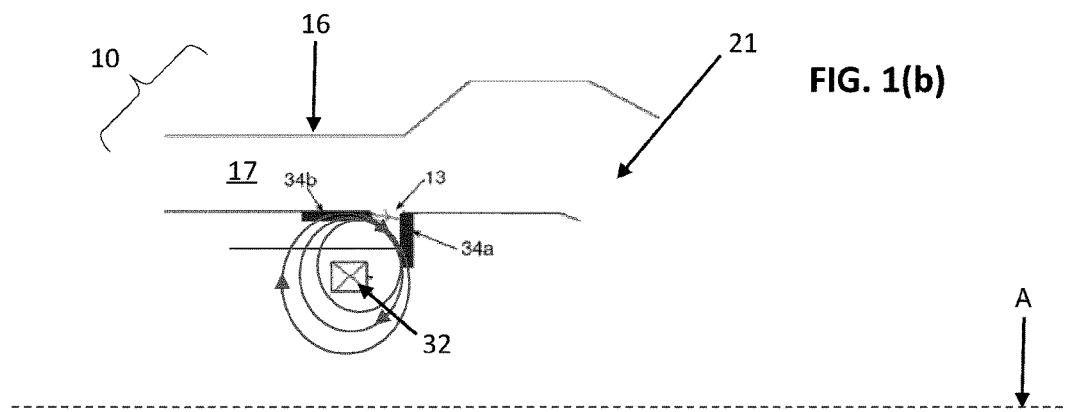

In one implementation, illustrated in FIG. 1(c), a ferromagnetic material 34a, 34b, such as a 430 grade stainless steel, can be placed on both sides of the acceleration gap 13 to increase the amount of reverse poloidal field 30 bridging across the gap 13. For example, the ferromagnetic material can be a ring 34a circumscribing the upstream end of the accelerating electrode 20 and/or an annular disc 34b circumscribing the downstream end of the inner (formation) electrode 15. Alternatively, the ferromagnetic material can comprise a series of spaced ferromagnetic segments (not shown) circumscribing one or both of the upstream end of the accelerating electrode 20 and the downstream end of the inner formation electrode 15. The amount of the reverse poloidal field 30 depends on the plasma's total poloidal flux and it can be in a range of $0.1-0.25*\psi_{CT}$, where $\psi_{CT}$ is the plasma's total poloidal flux. For example, for CT with $\psi_{CT}$=300 mWb, the reverse poloidal flux can be about $\psi_{RP}$=30-75 mWb. This is for illustration purposes only and for plasma torus with smaller or larger poloidal flux than 300 mWb, the reverse flux of the reverse poloidal field 30 across the acceleration gap 13 may 20 be accordingly set up to be smaller or larger values. The CT's poloidal flux $\psi_{CT}$ parameters and the reverse flux $\psi_{RP}$ parameters can be controlled by a number and position of the formation magnetic coils 18 and reverse poloidal magnetic coils 32 and the current flowing through such coils 18, 32.

Experiments conducted at General Fusion, Inc. (Burnaby, Canada) of plasma generation and acceleration systems with and without a reverse poloidal field generator have indicated that the configuration of the formation magnetic field 19 has a significant influence on plasma stability and confinement during formation and acceleration, and the absence of the reverse poloidal field generator may allow the pushing toroidal field to mix with the closed poloidal field and cause instability and reduced plasma confinement.

Figure 2A:
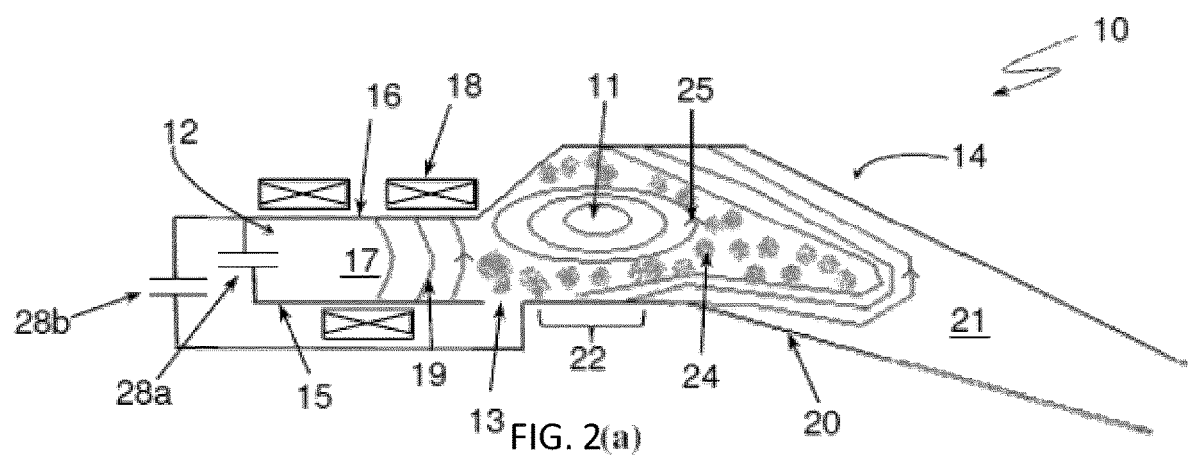
FIGS. 2(a)-(d) are schematic cross-section side views of a portion of a system for generating and accelerating magnetized plasma without a reverse poloidal field generator, used in experimental testing.
Figure 2B:
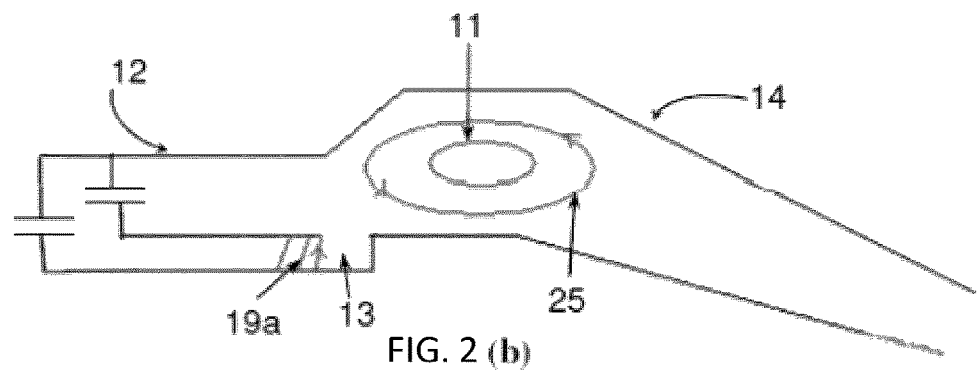
Figure 2C:
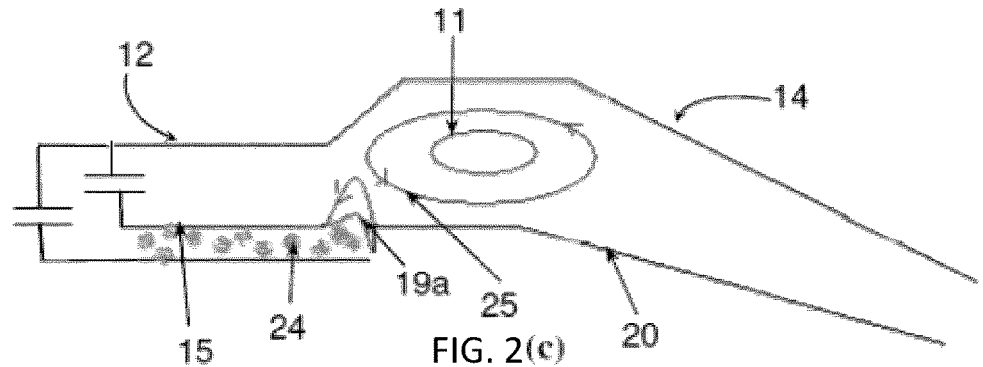

Referring to FIGS. 2(a)-(c), an experiment was conducted with a plasma generation and acceleration system without a reverse poloidal field generator, and it was found that when the configuration of the formation magnetic field 19 provided more open field lines in front of the plasma (past the acceleration gap 13, in the relaxation region 22), the produced plasma toroid 11 had a more compact configuration and longer temperature life in the plasma generator 12. However such configuration of formation field 19 was preventing a good acceleration of the plasma toroid 11. A reason for the relatively poor acceleration performance can be that the pushing toroidal field 24 can escape along the open field lines in front of the plasma toroid 11, between the plasma toroid 11 and the open field line (see FIG. 2(a)), so instead of pushing the plasma toroid 11 downwardly it blows out such open field lines while the bulk of the plasma toroid 11 stays in the relaxation region 22.

Figure 2D:
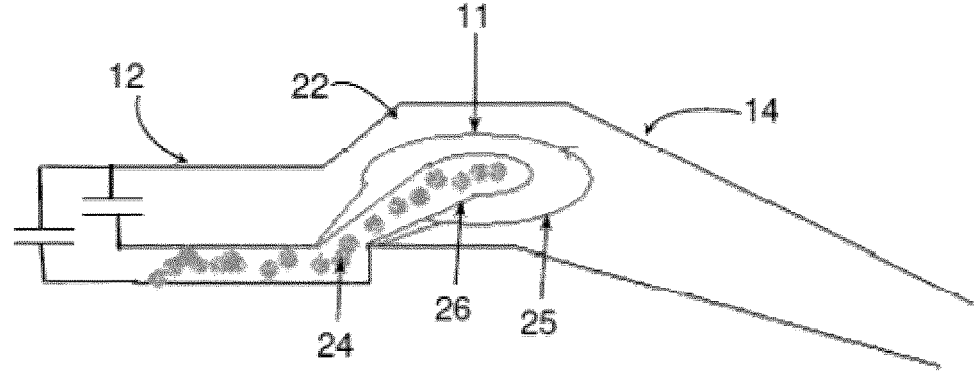

It was also noticed that during the formation of the plasma toroid 11 that some of the plasma (ionized gas) escaped through the acceleration gap 13 into the inner (formation) electrode 15. So, when the second (acceleration) current pulse was discharged, the pushing toroidal flux of the toroidal field 24 pushed such plasma forward, distorting the magnetic field lines of a poloidal formation magnetic field 19a in the acceleration gap 13 and through the gap 13, bubbling it out into the relaxation region 22 behind the plasma toroid 11 (see FIG. 2(c)). The magnetic field lines of the poloidal formation magnetic field 19a across the acceleration gap 13 are directed from the acceleration electrode 20 to the formation electrode 15. Because the poloidal formation magnetic field 19a is in an opposite direction from the back edge of the closed poloidal field 25 of the plasma toroid 11, the two poloidal fields 19a, 25 reconnected, opening a clear path 26 for the toroidal field 24 to get into the plasma's edge or possibly even to the core of the plasma toroid 11, inflating it with extra toroidal flux instead of pushing the plasma toroid 11 down the accelerator 14 (see FIG. 2(d)). In this case, the pushing toroidal field 24 mixed with plasma's closed poloidal field 25, and produced a plasma toroid 11 with a hollow configuration, since the pushing toroidal field 24 that flows in the plasma toroid 11 will push the plasma's poloidal field 25 outwards. In the hollow configuration of the plasma toroid 11, more plasma current flowed near the edge of the plasma than in the core, thus producing instabilities within the plasma that may destroy the plasma confinement. Mixing of the pushing toroidal field 24 with the closed poloidal field 25 of the plasma toroid 11 raises the q near the edge, changing the plasma's q profile and producing plasma instability that can destroy the plasma's confinement. Mixing of the pushing toroidal field 24 with the closed poloidal field 25 was measured by surface magnetic field sensors (not shown) positioned along the length of the plasma generator 12 and the accelerator 14. The sensors indicated that the toroidal field 24 rose at the same time the poloidal field 25 rose, indicating that the toroidal and the poloidal fields 24, 25 were mixed. Then, as the plasma toroid 11 passed such sensors, the poloidal field 25 dropped and the toroidal field 24 rose due to the pushing toroidal field 24 behind the plasma toroid 11.

It is theorized that trying to accelerate such a hollow plasma toroid 11 (that contains too much toroidal flux) by for example increasing the power to the accelerator, raises the chance of blow-by effects. A blow-by can occur when the magnetic pressure of the pushing current lifts the plasma toroid 11 from the acceleration electrode 20, allowing the toroidal pushing flux of the toroidal field 24 to expand ahead of the plasma toroid 11. Thus, if the current pulse across the accelerator 14 is shaped such that the generated toroidal field 24 is raised too fast, it can lift the plasma toroid 11 "up" towards the outside electrode 16 and pass "under" the plasma just on the surface of the accelerating electrode 20.

Figure 3A:
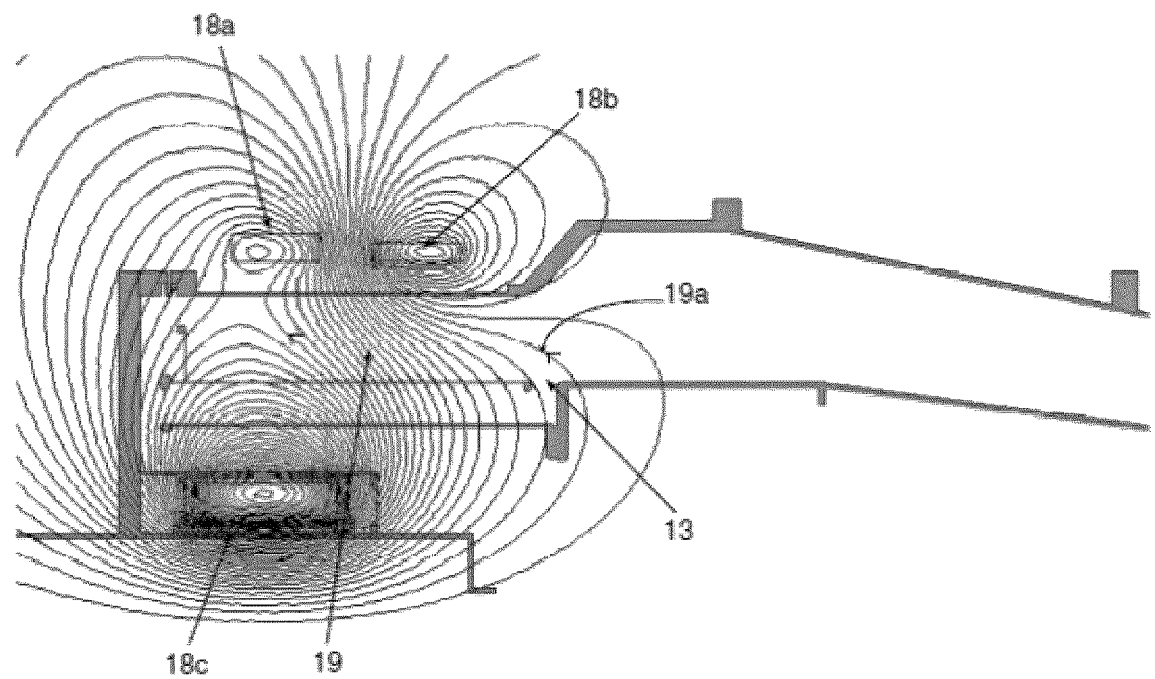
FIG. 3(a) illustrates an example of a computer simulation of a formation poloidal magnetic field configuration without a reverse poloidal magnetic field using the system shown in FIGS. 2(a)-(d).
Figure 3B:
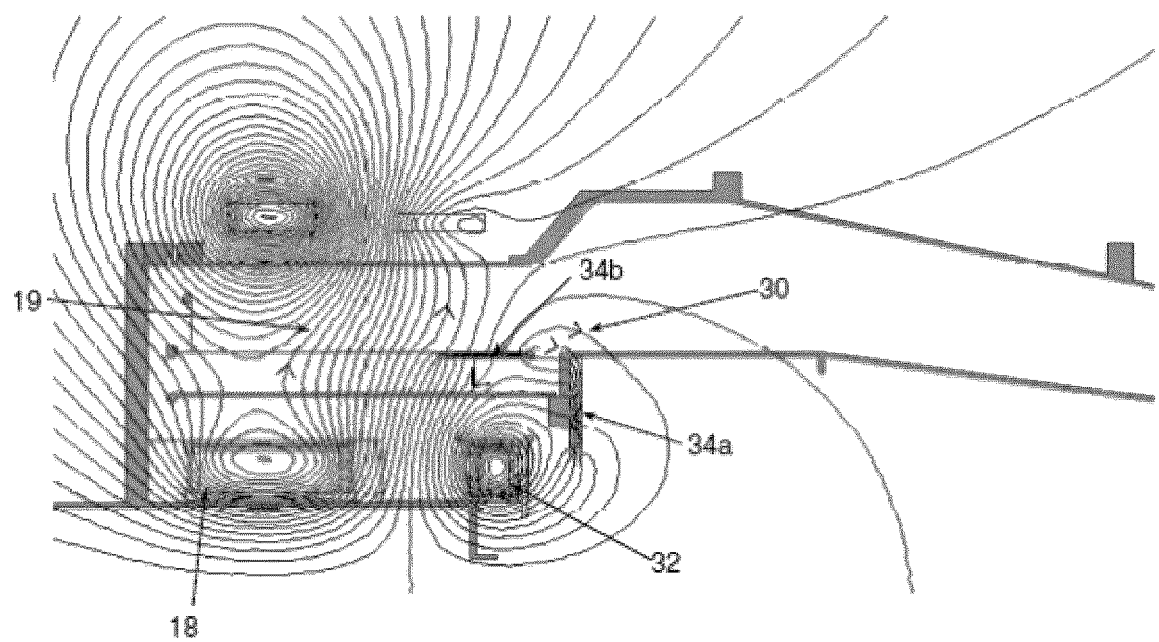
FIG. 3(b) illustrates an example of a computer simulation of a formation poloidal magnetic field configuration and a reverse poloidal magnetic field configuration across an acceleration gap, using the system shown in FIGS. 1(a)-(c).

Referring now to FIGS. 3(a) and (b), simulations were conducted of a plasma generation and acceleration system with and without a reverse poloidal field generator, using open source finite element analysis code FEMM (available from David Meeker, dmeeker@ieee.org). FIG. 3(a) illustrates a magnetic field configuration that provides only the poloidal formation magnetic field 19 and no reverse poloidal field 30. The formation magnetic field 19 is generated using three formation magnetic coils 18a, 18b, 18c. Less or more than three formation magnetic coils 18 can be used to provide the poloidal formation magnetic field 19. The current flowing through each of the formation magnetic coils 18 is carefully adjusted and pre-determined depending on the plasma's parameters. FIG. 3(b) shows a magnetic field confirmation wherein the formation magnetic field 19 is generated with three formation magnetic coils 18 and the reverse poloidal field 30 is generated using one reverse poloidal magnetic coil 32. The ferromagnetic plate 34a and annular ring 34b are also provided to increase the amount of reverse poloidal field 30 bridging across the acceleration gap 13. As indicated by the arrows, the direction of the reverse poloidal field 30 is opposite of the direction of the formation magnetic field 19. Persons skilled in the art would understand that more than one reverse poloidal magnetic coil 32 can be added to adjust configuration and the parameters of the reverse poloidal field 30 across the acceleration gap 13. The one or more reverse poloidal magnetic coils 32 can be positioned just left of the acceleration gap 13 (as shown in FIG. 3(b)) and near the symmetry axis, so that they can change the magnetic field configuration such that the magnetic field lines are moved toward the left side of the accelerator gap. The parameters of the current flow through the formation magnetic coils 18 and reverse poloidal magnetic coil(s) 32 can be pre-set depending on the pre-determined parameters of the plasma toroid 11 and the parameters of the power source 28a, 28b.

Embodiments of a system for plasma generation and acceleration system can be used for generation of high energy density plasma suited for applications in neutron generators, nuclear fusion, nuclear waste remediation, generation of medical nucleotides, for materials research, for remote imaging of the internal structure of objects via neutron radiography and tomography, x-rays generator, etc.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made without departing from the spirit of the inventions disclosed herein.

What is claimed is:

1. A system for generating and accelerating magnetized plasma, the system comprising:
    a plasma generator comprising ionizing electrodes operable to ionize a gas and a formation magnetic field generator configured to generate a formation magnetic field;
    a plasma accelerator fluidly coupled to the plasma generator and comprising accelerator electrodes operable to generate a pushing toroidal field, a downstream end of the plasma generator and an upstream end of the plasma accelerator together defining an acceleration gap and a relaxation region;
    a reverse poloidal field generator operable to generate a reverse poloidal field across the acceleration gap; and
    at least one power source electrically coupled to the ionizing electrodes and the accelerator electrodes, and operable to:
        generate a magnetized plasma toroid with a closed poloidal field that moves from the plasma generator to the relaxation region wherein the reverse poloidal field is behind the magnetized plasma toroid and has a same field direction as a back edge of the closed poloidal field and has an opposite field direction of the formation magnetic field; and
        generate the pushing toroidal field to push the reverse poloidal field against the closed poloidal field thereby accelerating the magnetized plasma toroid through the plasma accelerator.

2. The system as claimed in claim 1 wherein the formation magnetic field generator comprises as least one magnetic coil or at least one permanent magnet.

3. The system as claimed in claim 1 wherein the reverse poloidal field generator comprises at least one magnetic coil or at least one permanent magnet.

4. The system as claimed in claim 1, further comprising ferromagnetic material positioned at each side of the acceleration gap to increase the reverse poloidal field across the acceleration gap.

5. The system as claimed in claim 4 wherein the ferromagnetic material comprises at least one of a ring, annular disc and a series of spaced segments, circumscribing one or both of an upstream end of an inner electrode of the accelerator electrodes and a downstream end of an inner electrode of the ionizing electrodes.

6. The system as claimed in claim 1, wherein a number and location of the reverse poloidal magnetic generator is selected to generate a reverse poloidal flux of $0.1$-$0.25*\psi_{CT}$, wherein $\psi_{CT}$ is total poloidal flux of the magnetized plasma toroid.

7. The system as claimed in claim 2, wherein the formation magnetic field generator comprises three formation magnetic coils and the reverse poloidal field generator comprises one reverse poloidal magnetic coil.

8. The system as claimed in claim 1, wherein the ionizing electrodes are annular and define an annular plasma formation channel.

9. The system as claimed in claim 1 wherein the plasma toroid is a compact toroid or a spherical tokamak.

10. The system as claimed in claim 1 wherein the relaxation region is configured for the plasma toroid to expand and stabilize therein.

11. The system as claimed in claimed in claim 1, wherein the accelerator electrodes are annular and define an annular propagation channel that tapers inwardly from an inlet to an outlet.

12. The system as claimed in claim 1, wherein the at least one power source comprises at least one capacitor bank, and is operable to provide a first current pulse to the plasma generator and a second current pulse to the plasma accelerator.

13. The system as claimed in claim 1, wherein the reverse poloidal field is configured to inhibit mixing of the pushing toroidal field with the closed poloidal field.

14. A method for generating and accelerating magnetized plasma comprising:
ionizing a gas in a plasma generator and generating a formation magnetic field, and generating a magnetized plasma toroid with a closed poloidal field that moves from the plasma generator into a relaxation region;
generating a reverse poloidal field behind the magnetized plasma toroid, the reverse poloidal field having a same field direction as a back edge of the closed poloidal field and having an opposite field direction of the formation magnetic field; and
generating a pushing toroidal field that pushes the reverse poloidal field against the closed poloidal field, thereby accelerating the magnetized plasma toroid through a plasma accelerator downstream from the plasma generator.

15. The method as claimed in claim 14 wherein the plasma generator comprises an annular plasma formation channel, and wherein forming the magnetized plasma comprises injecting the gas into the annular plasma formation channel to form the magnetized plasma toroid.

16. The method as claimed in claim 14 wherein the magnetized plasma toroid is a compact toroid or a spherical tokamak.

17. The method as claimed in claim 14, wherein the gas comprises any one or mixture of hydrogen, isotopes of hydrogen, neon, argon, krypton, xenon and helium.

18. The method as claimed in claim 14, wherein after generation in the plasma generator and prior to acceleration in the plasma accelerator, the magnetized plasma toroid expands and stabilizes in the relaxation region.

19. The method as claimed in claim 14, further comprising sending a first current pulse to the plasma generator to ionize the gas and create the closed poloidal field, and sending a second current pulse to the plasma accelerator to generate the pushing toroidal field.

20. The method as claimed in claim 14, wherein the reverse poloidal field is generated across an acceleration gap between a downstream end of the plasma generator and an upstream end of the plasma accelerator.

21. The method as claimed in claim 19 wherein generating the reverse poloidal field comprises generating a reverse poloidal flux in the range of $0.1$-$0.25*\psi_{CT}$, wherein $\psi_{CT}$ is a total poloidal flux of the magnetized plasma toroid.

22. The method as claimed in claim 14, wherein the plasma accelerator comprises a tapering annular channel, and the method further comprises compressing and heating the plasma toroid while accelerating through the tapering annular channel.

* * * * *